United States Patent
Kang et al.

(10) Patent No.: US 7,729,459 B1
(45) Date of Patent: Jun. 1, 2010

(54) SYSTEM AND METHOD FOR PROVIDING A ROBUST ULTRA LOW POWER SERIAL INTERFACE WITH DIGITAL CLOCK AND DATA RECOVERY CIRCUIT FOR POWER MANAGEMENT SYSTEMS

(75) Inventors: Dae Woon Kang, Boulder, CO (US); James T. Doyle, Nederland, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 1204 days.

(21) Appl. No.: 11/095,288

(22) Filed: Mar. 31, 2005

(51) Int. Cl.
    *H04L 7/00* (2006.01)
(52) U.S. Cl. .............. 375/354; 327/141; 358/409; 370/503; 713/400; 714/12
(58) Field of Classification Search .......... 375/354, 375/340, 375, 376, 371, 373, 319, 348, 219; 327/141; 358/409; 370/503; 713/400; 714/12
    See application file for complete search history.

(56) References Cited

U.S. PATENT DOCUMENTS

| | | | |
|---|---|---|---|
| 5,671,258 A * | 9/1997 | Burns et al. | 375/359 |
| 5,991,415 A | 11/1999 | Shamir | |
| 6,108,419 A | 8/2000 | LaMacchia et al. | |
| 6,166,572 A * | 12/2000 | Yamaoka | 327/149 |
| 6,298,135 B1 | 10/2001 | Messerges et al. | |
| 6,373,911 B1 * | 4/2002 | Tajima et al. | 375/375 |
| 6,754,840 B2 | 6/2004 | Poisner | |
| 6,965,673 B1 | 11/2005 | Boneh et al. | |
| 7,590,880 B1 | 9/2009 | Hershman | |
| 2002/0090043 A1 * | 7/2002 | Cho | 375/371 |
| 2002/0090045 A1 * | 7/2002 | Hendrickson | 375/376 |
| 2003/0065966 A1 | 4/2003 | Poisner | |
| 2004/0037383 A1 * | 2/2004 | Song | 375/371 |
| 2004/0155687 A1 * | 8/2004 | Lee et al. | 327/165 |
| 2006/0044037 A1 * | 3/2006 | Gomm et al. | 327/261 |

OTHER PUBLICATIONS

Ansgar Pottbacker et al., "A Si Bipolar Phase and Frequency Detector IC for Clock Extraction Up to 8 Gb/s", IEEE Journal of Solid-State Circuits, vol. 27, No. 12, Dec. 1992, pp. 1747-1751.

Hui Zhang et al., " Low-Swing On-Chip Signaling Techniques: Effectiveness and Robustness", IEEE Transactions on Very Large Scale Integration (VLSI) Systems, vol. 8, No. 3, Jun. 2000, pp. 264-272.

(Continued)

*Primary Examiner*—David C Payne
*Assistant Examiner*—Zewdu Kassa (57) ABSTRACT

A system and method is disclosed for providing a robust ultra low power serial interface with a digital clock and data recovery circuit for power management systems. In one advantageous embodiment a digital clock and data recovery circuit of the invention comprises a quadruple phase clock generator circuit that generates four shifted clock signals, a decision logic circuit, a state detector circuit, and an edge detector circuit. The detected edges of data signals are used to latch the state of the four shifted clock signals. The state detector circuit selects a stable clock signal among the four shifted clock signals for use as a recovered clock signal and synchronizes the recovered clock signal at a center of the data signal. The selected recovered clock signal remains available until another data signal transition is detected.

21 Claims, 7 Drawing Sheets

OTHER PUBLICATIONS

Benny Lai et al., "A Monolithic 622Mb/s Clock Extraction Data Retiming Circuit", ISSC91/Session 8/Hard-Disk and Data-Communication IC's/Paper TP 8.7, 1991 IEEE International Solid-State Circuits Conference, pp. 144 & 306.

Dae Woon Kang et al., "A Low Power Methodology for Portable Electronics", 8 pages.

Chen Hau Jiun et al., "A Monolithic 622MB/S Half Rate Clock And Data Recovery Circuit Utilizing A Novel Linear Phase Detector", 2004 IEEE, pp. 348-351.

Dae Woon Kang, "Versatile Clock Management System for a Single Pin Serial Interface Protocol", U.S. Appl. No. 11/225,500, filed Sep. 13, 2005.

Dae Woon Kang et al., "A Robust Ultra Low Power Serial Interface with Fully Digital Clock and Data Recovery Circuit for PowerWise™ Interface", Oct. 9, 2004, 5 pages.

Gu-Yeon Wei et al., "A Fully Digital, Energy-Efficient, Adaptive Power-Supply Regulator", IEEE Journal of Solid-State Circuits, vol. 34, No. 4, Apr. 1999, pp. 520-528.

Keith A. Bowman et al., "Impact of Extrinsic and Intrinsic Parameter Fluctuations on CMOS Circuit Performance", IEEE Journal of Solid-State Circuits, vol. 35, No. 8, Aug. 2000, pp. 1186-1193.

Thomas D. Burd et al., "Design Issues for Dynamic Voltage Scaling", ISLPED 2000, Rapallo, Italy, pp. 9-14.

Jaeha Kim et al., "An Efficient Digital Sliding Controller for Adaptive Power Supply Regulation", 2001 Symposium on VLSI Circuits Digest of Technical Papers, pp. 133-136.

Massoud Pedram, Design Technologies for Low Power VLSI, 1995, 32 pages.

Guilley S., et al., "Silicon-level Solutions to Counteract Passive and Active Attacks", Proc. Fifth Workshop Fault Tolerance and Detection in Cryptography (FDTC), pp. 3-17, Aug. 2008.

* cited by examiner

SYSTEM AND METHOD FOR PROVIDING A ROBUST ULTRA LOW POWER SERIAL INTERFACE WITH DIGITAL CLOCK AND DATA RECOVERY CIRCUIT FOR POWER MANAGEMENT SYSTEMS

TECHNICAL FIELD OF THE INVENTION

The present invention relates generally to power management systems for wireless communication devices and, more particularly, to a system and method for providing a robust ultra low power serial interface with a digital clock and data recovery circuit for power management systems.

BACKGROUND OF THE INVENTION

The trend in electronics is to move more and more computing resources into portable and wireless applications. As a result, portable power handheld products and computers now account for nearly ten percent of total power usage. A significant portion of this ten percent is represented by battery charging efficiencies and the cost of manufacturing power delivery systems. Manufacturers have begun to realize that the size and run time demands of the newer types of portable equipment cannot be met by increasing the energy density in batteries.

To increase the functionality and run time of wireless devices manufacturers are turning to high efficiency management of system functions. When the amount of energy that is needed to complete a function is decreased the battery has more energy left to perform other processes. This approach to energy management has been applied to several common wireless functional blocks such as the digital signal processing (DSP) block and the microprocessor.

The shrinking of the size of integrated circuit process technology to the deep submicron range (less than thirteen hundredths of a micron (0.13 μm)) has caused the amount of leakage to equal or exceed the portion of dynamic power dissipation. Unless the leakage is reduced, the power delivery in the deep submicron era will ultimately restrict the ability of handheld wireless devices to meet the customer demand for improved capabilities.

The 2.5 GPRS (General Packet Radio Service) EDGE (Enhanced Data for GSM Evolution) standard for GSM (Global System for Mobile Communications) that presently dominates the cellular market presently uses relatively low efficiency linear power amplifiers to achieve the required data rate as well as to meet multimode and multiband requirements. Power amplifiers play a critical role in determining the efficiency of a radio frequency (RF) system because of their high output power levels, which can reach three watts (3.0 W) for some cellular systems. As a result, the design of highly efficient power amplifiers is of great importance in order to extend battery life.

A. Adaptive Voltage Scaling

As semiconductor process technology utilizes lower voltages and reaches deep submicron levels, the number of transistors that may be placed on an integrated circuit chip has increased according to Moore's Law. This development has presented two critical circuit design issues. The first issue is the non-uniformity of process parameters within a single integrated circuit die. The second issue is the increment of power consumption per integrated circuit die.

In deep submicron circuit design, variations due to the non-uniformity of process parameters within a single integrated circuit die cause differences in transistor and interconnect characteristics within a single integrated circuit die. These differences in turn impact the performance of the circuit because they generate deviations in MOSFET (Metal Oxide Semiconductor Field Effect Transistor) drive current, resulting in propagation delay distributions of the critical path across the integrated circuit chip. Furthermore, the distribution of process parameters expands from die to die within a wafer as well as within a lot.

After fabrication, operating variations such as power supply voltage, chip temperature and across-chip temperature also affect the propagation delay. By combining both operational and process induced variations, the propagation delay fluctuates from approximately eighteen percent (18%) to approximately thirty two percent (32%). The yield of CMOS (Complementary Metal Oxide Semiconductor) logic circuits satisfying a specific performance requirement is significantly influenced by the magnitude of critical path delay deviations due to both operational and intrinsic parameter fluctuations.

To compensate for the impact of these parameter fluctuations and to achieve a desired yield, there are two possible approaches. The first approach is to reduce the performance by operating at a lower clock frequency. The second approach is to increase the supply voltage.

While the operating frequency limits allowable propagation delay, this delay strongly depends on intrinsic process parameters, supply voltage and junction temperature (abbreviated With the letters PVT for parameters, voltage, and temperature). The propagation delay in a MOSFET is proportional to the product of the active resistance of the MOSFET and load capacitance in accordance with the following expressions:

$$R_{ON} = \frac{V_{DD}}{\beta(V_{DD}-V_T)^\alpha} \quad (1)$$

$$C_L = C_D + C_G + C_W \quad (2)$$

The term $R_{ON}$ is the active resistance of the MOSFET. The term $C_L$ is the load capacitance. The term $\alpha$ is a velocity saturation term. The term $\beta$ is the process transconductance parameter. The term $V_{DD}$ is the supply voltage. The term $V_T$ is the threshold voltage. The term $C_D$ is the drain capacitance. The term $C_G$ is the gate capacitance. The term $C_W$ is the interconnect capacitance.

If a design is fabricated as the best process corner, and is operating at low temperature, in the worst case it needs less than three fourths (¾) of the minimum supply voltage. K. A. Bowman, Xinghai Tang, J. C. Eble, and J. D. Meindl, "Impact of Extrinsic and Intrinsic Parameter Fluctuations on CMOS Circuit Performance," IEEE Journal of Solid State Circuits, Volume 35, No. 8, pp. 1186-1193, August 2000. Process parameters and operating junction temperature are not controllable, but the supply voltage is controllable. This results in opportunities to reduce power consumption by adjusting supply voltage with regard to process and temperature.

In many portable computing devices (e.g., MP3 players and digital cameras) the full processing power of a processor is not required all the time. There are certain times when an operating frequency can be reduced, and a lower frequency means a longer allowable delay. This longer time margin also allows a supply voltage level to be lowered whereas the applied lower voltage increases the propagation delay. Power consumption is quadratic with the supply voltage and is proportional to the operating frequency. Because of these relationships, reducing both the operating frequency and the supply voltage provides an excellent energy-efficient operation.

This technique is referred to as adaptive voltage scaling (AVS). Adaptive voltage scaling decreases power consumption without sacrificing performance provided that the tasks to be performed are finished within the allowed time. From the trade off between performance and energy consumption, supplying just enough voltage to a system at a given frequency represents its optimum power consumption.

For additional information on adaptive voltage scaling, refer to the following papers. T. D. Burd and R. W. Brodersen1, "Design Issues for Dynamic Voltage Scaling," in 2000 Proceedings of the ISLPED Conference, pp. 9-14. G.-Y. Wei and Mark Horowitz, "A Fully Digital, Energy-Efficient Adaptive Power-Supply Regulator," IEEE Journal of Solid State Circuits, Volume 34, No. 4, pp. 520-528, April 1999. D. W. Kang, "Low Power Digital Adaptive Voltage Controller Design Based on Hybrid Control and Reverse Phase Mode," Ph.D. dissertation, Dept. Elec. and Comp. Eng., Northeastern University, Boston, Mass., 2003. J. Kim and Mark Horowitz, "An Efficient Digital Sliding Controller for Adaptive Power Supply Regulation," in 2001 Proceedings of the VLSI Circuits Dig. Tech. Papers Conf., pp. 133-136.

Adaptive voltage scaling (AVS) in the general sense refers to a power supply rail that adjusts its voltage corresponding to the demands of its load. Its load could be any compliant electronic device. The enormous benefit of adaptive voltage scaling (AVS) is that for completing the same function, an AVS compliant processor will use thirty percent (30%) to sixty percent (60%) less energy than a fixed voltage processor. The way to reduce energy consumption in a processor, then, is not only to reduce the clock frequency as low as possible, but, more importantly, to reduce the core supply voltage to the minimum amount for a given clock frequency.

B. Low Voltage Differential Signaling

Serial data streaming techniques have become important in the field of interface microelectronics as manufacturers continue to adopt the technology for intra-system connections. As electronic technology has developed in sophistication, the inability of parallel transmission to accommodate higher speeds and wider words has become more apparent. Designing systems with wide parallel word paths has proved to be too cumbersome and has presented serious technical challenges in the areas of noise, power, speed and cost. Alternatively, low voltage differential signaling (LVDS) combines extremely low power consumption and exceptionally low electrical and radiated noise, with data transmission speeds that are hundreds of times faster—up to tens of GigaHertz—versus parallel single-ended signaling.

Differential signaling operates at the receiver by comparing the difference between two signals. The constant current used in most forms of differential signaling reduces the amount of noise induced into the electrical system. The opposing currents of the two signals that comprise the differential signal cancel out a large portion of the magnetic field of the other signal, thus reducing irradiated emissions. In this way, noise induced into one signal is conversely induced into the other signal, so that the difference between the two signals is not affected. This phenomenon allows the differential signal to operate at reduced signaling levels compared to single-ended signals, thus reducing emissions even further.

The greatest drawback to using parallel single-ended techniques, however, proved not to be the issue of speed, but the substantial increase in radiated noise from the greater number of parallel signals needed to provide the additional bits. A more attractive alternative is serialization via differential signaling techniques. Serialization not only reduces emissions to meet stringent government mandates but also limits the number of wires running through the small-diameter hinge connecting the base unit to the display. This further increases the mechanical integrity and reliability of the connection.

After crosspoint switching became available at the silicon level, serialization of the communications transmission network moved from the inter-system to the intra-system level. Transmitting the serialized data through the system in the same form it was sent over the network was the natural choice. The input signals must be synthesized to operate at faster speeds to meet the high-speed requirements of modern communication in the world today. Both optical and high-speed differential signaling are being investigated and used to achieve these goals.

Improved serialization techniques have opened the door to new applications, particularly in the ultra-portable realm of cell phones and battery powered devices. Cell phones, for example, are encountering many challenges such as high-resolution displays with more colors. Cameras and other convergent functions that are now appearing in cell phones add complexity to the challenge of sending signals across the hinge in clamshell designs (also called flip designs). The bi-directional microcontroller interface occasionally used to lower power between the base and the display poses a new challenge of how to efficiently provide serialization in opposite directions.

Bi-directional serialization provided the solution, but the microcontroller interface posed its own challenge for the serializer. In the past, all serializers were provided with a constant clock at the parallel data rate that was used to develop the high-speed serial clock used for the serial transmission of the data. This parallel clock was not something that was normally available with a microcontroller interface. With the latest serializers and deserializers, it is still necessary to provide a constant clock, but not necessarily at the same frequency as the interface.

Three additional considerations—power, size and cost—grew in importance with the use of serializers in ultra-portable consumer applications. Battery life, an important consideration in all mobile applications, becomes even more critical when the application itself limits the size of the battery, and the primary location of the device is in a pocket of the user rather than on a desktop.

For the last ten years at least, the industry has struggled with how to best integrate serialization. Some of these key integration issues center around the twofold need for high-speed clocking and highly tailored input/output (I/O). The integration of high-speed signaling has proved an extremely difficult challenge due to signaling power requirements and the noise that is generated by the rest of the device. A significant breakthrough for VLSI (Very Large Scale Integration) techniques, low voltage differential signaling (LVDS) is a fairly noise-free and immune technology that offers the double advantage of very low power consumption and excellent noise rejection characteristics. The power and electromagnetic interference (EMI) requirement of mobile applications provides another challenge in this area.

For the reasons described above single-ended parallel techniques have inherent drawbacks. The advantages of differential serial data streaming and advances in the manufacture of serializer/deserializer systems will likely accelerate the proliferation of serialized intra-system data interfaces in all application areas.

Data transmission between different digital signal processing integrated circuits (ICs) influences the power consumption and the system cost. Improvements in the performance of the input/output (I/O) bottleneck to communicate digitally between the integrated circuits (ICs) have been made at the expense of the increased on-chip power dissipation. Output switching times in the subnanosecond range result in the fact that the di/dt noise coupled into the power distribution network becomes unacceptable, especially when many output pads switch simultaneously.

Digital CMOS devices typically drive their output pads with a simple CMOS inverter which swings the output pad from ground to the supply voltage $V_{DD}$, and the output inverter driven by a chain of scaled inverters is larger, in order to drive its huge capacitance output load quickly. This, in turn, contributes considerably to the total power dissipation of applications.

In submicron CMOS circuits, the dynamic factor accounts for eighty five percent (85%) to ninety percent (90%) of the total power consumption because the threshold voltage is commonly on the order of thirty five hundredths of a volt (0.35 V) to seven tenths of a volt (0.70 V) so that the leakage current is negligible. See, for example, M. Pedram, "Design Technologies for Low Power VLSI," in Encyclopedia of Computer Science and Technology, Volume 36, Marcel Dekker, Inc., pp. 73-96, 1997.

Therefore, power dissipation in digital CMOS circuits is approximately:

$$P_{CMOS} \approx R_{dynamic} = \alpha f C (V_{DD})^2 \quad (3)$$

From Equation (3) the supply voltage reduction appears to be the most promising method to reduce dynamic power dissipation because of its quadratic dependency to power. Therefore, the power dissipation problem in transmission lines can be solved by reducing the signal swing on the output driver. The problem with this method is that the lower supply voltages will cause a reduction in performance as indicated in Equations (1) and (2). As the value of the supply voltage approaches the threshold voltage, the circuit delays abruptly become large because the output capacitance is charged and discharged very slowly.

The simple approach of sizing the final output driver stage sufficiently large to allow driving a terminated transmission line is problematic on the aspect of power dissipation. For example, with one and two tenth volt (1.2 V) logic swings, even the technique of terminating a fifty ohm (50Ω) line with a Thevenin equivalent fifty ohm (50Ω) resistor to six tenths of a volt (0.6 V) demands a current drive of twelve and one half milliamps (12.5 mA). A shape factor of several thousand is thus required to lower the resistance of the output driver to a level where the voltage drop across the output transistors is several percent of the swing.

On the other hand, low voltage differential signaling (LVDS) is an alternative for a low power and high performance interface. The terminator power dissipation is reduced by the square of the voltage swing, and the rise/fall times are also decreased due to its small rail-to-rail supply range. Because the di/dt effect is reduced due to the decrease in absolute current, the noise, as a fraction of the signal voltage swing, remains constant. The effective impedance of the device should still be a small fraction of the line impedance, in order to achieve acceptable noise margins. The output driver transistors operate in either the cutoff or linear regions. By controlling the gate-to-source voltage, this linear resistance can be forced to match the resistance of the external line.

It is not desirable to have a high power digital interface driving low power analog circuits for a total overall power reduction. A power saving alternative may be found in using low swing high speed serial data transmission. H. Ahzng, V. George, and J. M. Rabaey, "Low Swing On-Chip Signaling Techniques: Effectiveness and Robustness," IEEE Journal of Solid State Circuits, Volume 8, No. 3, pp. 264-272, 2000.

This kind of high speed data transmission has to be asynchronous. To find an economic solution, clock recovery from the NRZ (Non-Return to Zero) data stream is required because in an asynchronous serial data link, there is no common clock connection between the data sender and receiver. Typically, a phase lock loop (PLL) is employed to phase lock to the data and control the frequency of a new, local clock. See, for example, B. Lai and R. C. Walker, "A Monolithic 622 Mb/s Clock Extraction Data Retiming Circuit," Int. Solid State Circuits Conf., pp. 144-145, San Francisco, Calif., 1991. See also A. Pottbaecker, U. Langmann, and H.-U. Schreiber, "A Si Bipolar Phase and Frequency Detector IC for Clock Extraction up to 8 Gb/s," IEEE Journal of Solid State Circuits, Vol. 27, No. 12, pp. 1747-1751, 1992. It would be desirable to have a low power high swing serial interface circuit with a digital clock and data recovery (CDR) circuit that does not employ a phase locked loop (PLL) circuit.

Therefore, there is a need in the art for a system and method that is capable of providing an improved low power high swing serial interface with a digital clock and data recovery (CDR) circuit. In particular, there is a need in the art for a system and method that is capable of providing a robust ultra low power high swing serial interface circuit with a digital clock and data recovery (CDR) circuit that does not employ a phase locked loop (PLL) circuit.

SUMMARY OF THE INVENTION

To address the above-discussed deficiencies of the prior art, it is a primary object of the present invention to provide a robust ultra low power high swing serial interface circuit with a digital clock and data recovery circuit that does not employ a phase locked loop (PLL) circuit.

In one advantageous embodiment a digital clock and data recovery circuit of the invention comprises a quadruple phase clock generator circuit that generates four shifted clock signals, a decision logic circuit, a state detector circuit, and an edge detector circuit. The quadruple phase clock generator circuit provides the four shifted clock signals to the decision logic circuit and to the state detector circuit.

The edge detector circuit detects the rising and falling edges of data signals in an incoming data stream. The edge detector provides a detected edge of a data signal to the state detector circuit. The state detector circuit uses the detected edge to latch the state of the four shifted clock signals. The state detector circuit selects a stable clock signal among the four shifted clock signals for use as a recovered clock signal. The state detector circuit synchronizes the recovered clock signal at a center of the data signal.

The state detector circuit provides a signal to the decision logic circuit and the selected recovered clock signal is used as the recovered clock signal. The selected recovered clock signal remains available until another data signal transition is detected.

It is an object of the present invention to provide a system and method for providing an improved clock and data recovery circuit.

It is also an object of the present invention to provide a system and method for providing an improved clock and data recovery circuit that does not employ a phase locked loop (PLL) circuit.

It is yet another object of the invention to provide a system and method for providing an improved clock and data recovery circuit that comprises a phase clock generator circuit that generates a plurality of shifted clock signals, a decision logic circuit, a state detector circuit, and an edge detector circuit.

It is also another object of the invention to provide a system and method for providing an improved clock and data recovery circuit that comprises a quadruple phase clock generator circuit that generates four shifted clock signals, a decision logic circuit, a state detector circuit, and an edge detector circuit.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future, uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged semiconductor device.

Differential current mode techniques may be applied to a serial interface to provide common mode noise rejection and immunity from package and interconnect losses, and to provide high performance, low power and immunity from voltage drops and noise. Current sources are not affected by series drops because the source impedance is high. The required voltage swing (while still providing adequate noise margins) can be reduced (0.4 volts ECL (Emitter Coupled Logic)). To directly detect transitions with simple capacitive coupling allows the use of direct NRZ (Non-Return to Zero) coding. There is no need for bit synchronization.

A two (2) wire differential low voltage transmitter utilizes two (2) wire differential coding that uses only N channel drivers. This reduces the output driver and size to provide lower capacitive switching loss. The input stage can be a comparator with a small bit of hysteresis. This also provides noise immunity and good common mode noise rejection.

On the receiver side, a prior art recovery clock is typically regenerated from the data with a data recovery phase locked loop (PLL). Phase locked loops (PLL) tend to be both power hungry and complex. In the present invention, the method of clock recovery is based on a quadruple shifted phase generator without a phase locked loop (PLL).

Figure 1:
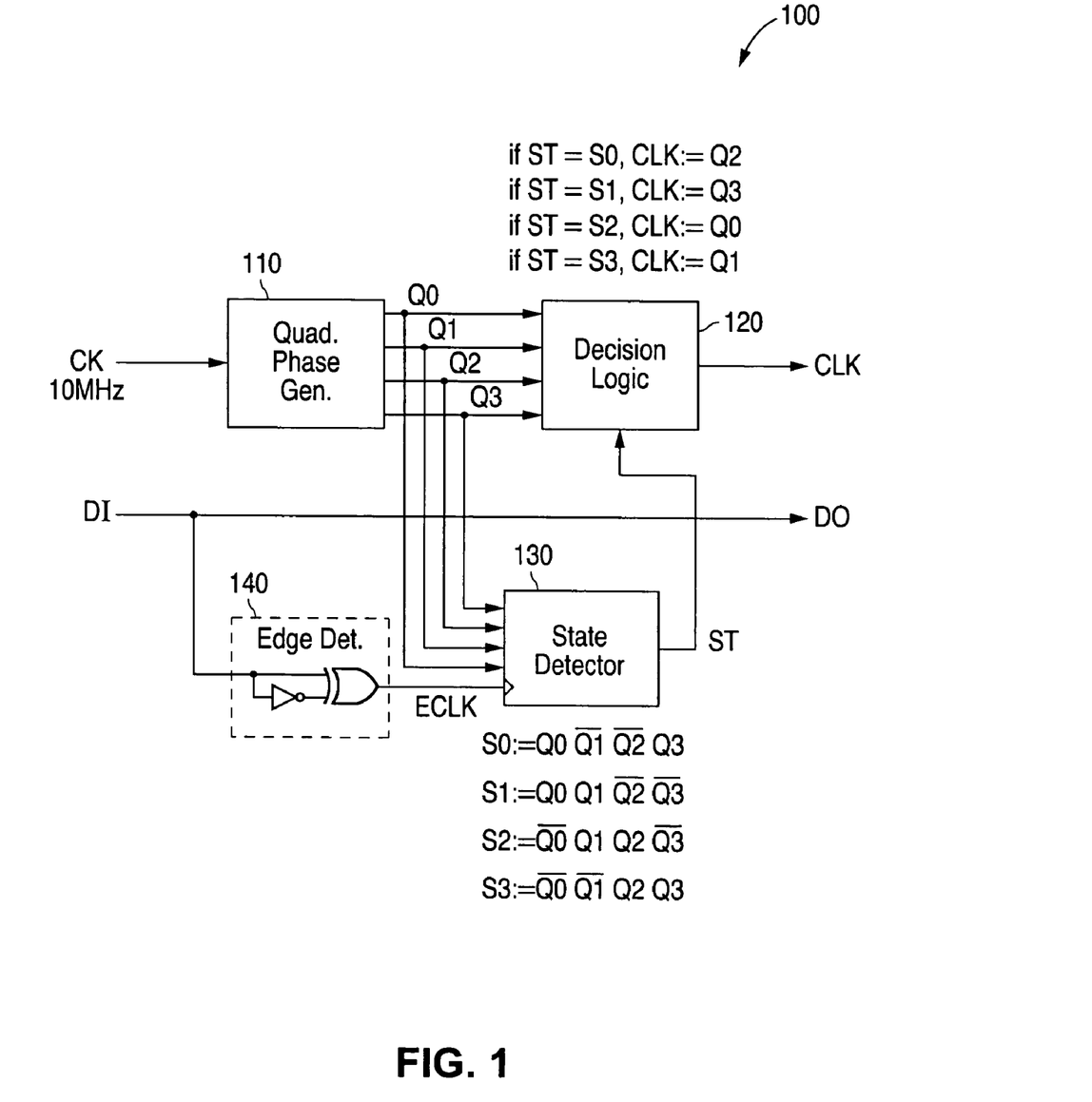
FIG. 1 is a block diagram illustrating a clock and data recovery (CDR) circuit in accordance with an advantageous embodiment of the present invention.

FIG. 1 is a block diagram illustrating a clock and data recovery (CDR) circuit 100 in accordance with an advantageous embodiment of the present invention. Clock and data recovery (CDR) circuit 100 comprises a quadruple phase clock generator circuit 110, a decision logic circuit 120, a state detector circuit 130 with an edge detector circuit 140. The elements of clock and data recovery (CDR) circuit 100 are coupled together as shown in FIG. 1. The decision logic circuit 120 is controlled by the state detector circuit 130.

The quadruple phase clock generator circuit 110 receives as input a clock signal (designated with the letters "CK"). In the advantageous embodiment shown in FIG. 1 the clock signal CK has a frequency of ten megahertz (10 MHz). The output of the quadruple phase clock generator circuit 110 comprises four (4) shifted clock signals (designated respectively as "Q0", "Q1", "Q2" and "Q3"). The four (4) shifted clock signals are provided as input to the decision logic circuit 120 and to the state detector circuit 130. The output of the state detector circuit 130 (designated with the letters "ST") is provided as an input to the decision logic circuit 120. The output of the decision logic circuit 120 is a clock signal (designated with the letters "CLK").

The edge detector circuit 140 receives as input a copy of the data signal (designated with the letters "DI"). The output of the data signal is designated with the letters "DO." The edge detector circuit 140 detects the rising and falling edges of the data signal DI. The edges that are detected by the edge detector circuit 140 (designated with the letters "ECLK") are provided to the state detector circuit 130 and are used to latch the state of the four (4) shifted clock signals from the quadruple phase generator circuit 110.

Figure 2A:
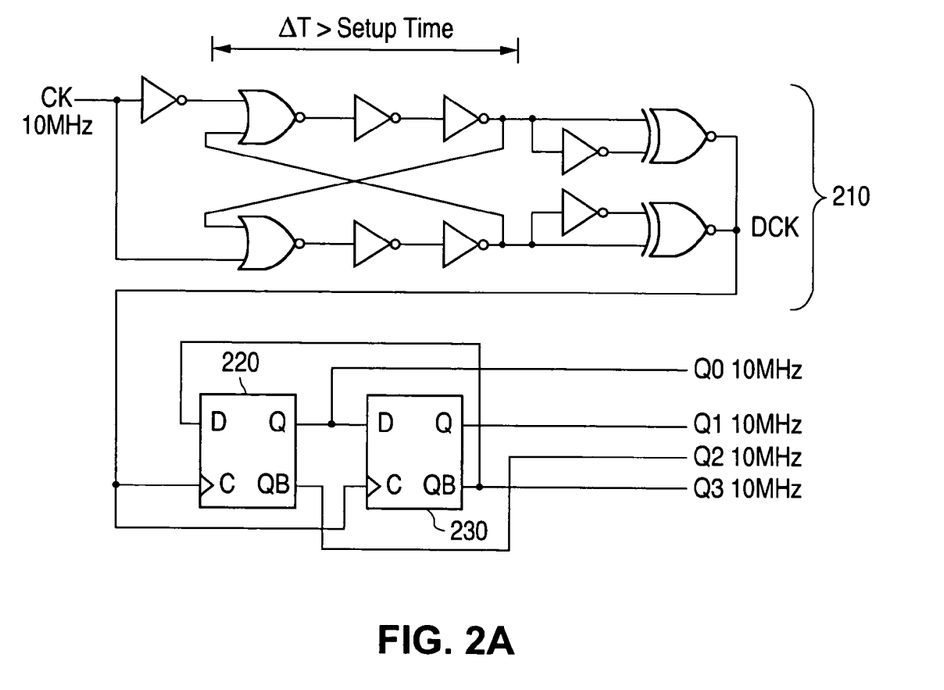
FIG. 2A is a block diagram illustrating a quadruple phase clock generator circuit in accordance with an advantageous embodiment of the present invention.

FIG. 2A is a block diagram illustrating the elements of the quadruple phase clock generator circuit 110 in more detail. Quadruple phase clock generator circuit 110 comprises a frequency doubler circuit 210, a first D-flip flop circuit 220, and a second D-flip flop circuit 230 coupled together as shown in FIG. 2A. The time for the clock signal CK to traverse the first portion of the frequency doubler circuit 210 (designated ΔT) is greater than the setup time. The frequency doubler circuit 210 outputs a glitch clock signal (designated with the letters "DCK") to the clock inputs of the first D-flip flop circuit 220 and the second D-flip flop circuit 230.

Figure 2B:
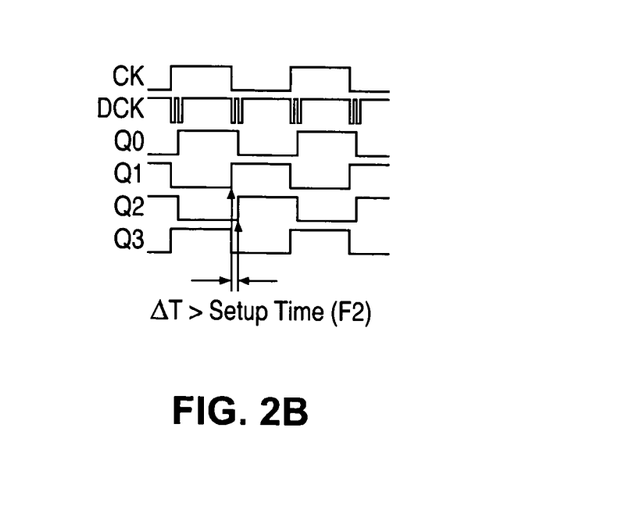
FIG. 2B is a timing diagram illustrating some signal waveforms of the quadruple phase clock generator circuit shown in FIG. 2A.

The glitch clock signal DCK toggles four (4) times in an input period (10 MHz or one hundred nanoseconds (100 ns)). The period of the glitch clock signal DCK may be adjusted along with a delay factor (capacitance). The quadruple phase clock generator circuit 210 generates the four (4) shifted clock signals (Q0, Q1, Q2 and Q3) from the glitch clock signal DCK. The quadruple phase clock generator circuit 110 provides the four (4) shifted clock signals (Q0, Q1, Q2 and Q3) to the decision logic circuit 120 and to the state detector circuit 130. FIG. 2B is a timing diagram illustrating some signal waveforms of the quadruple phase clock generator circuit 110.

Figure 3:
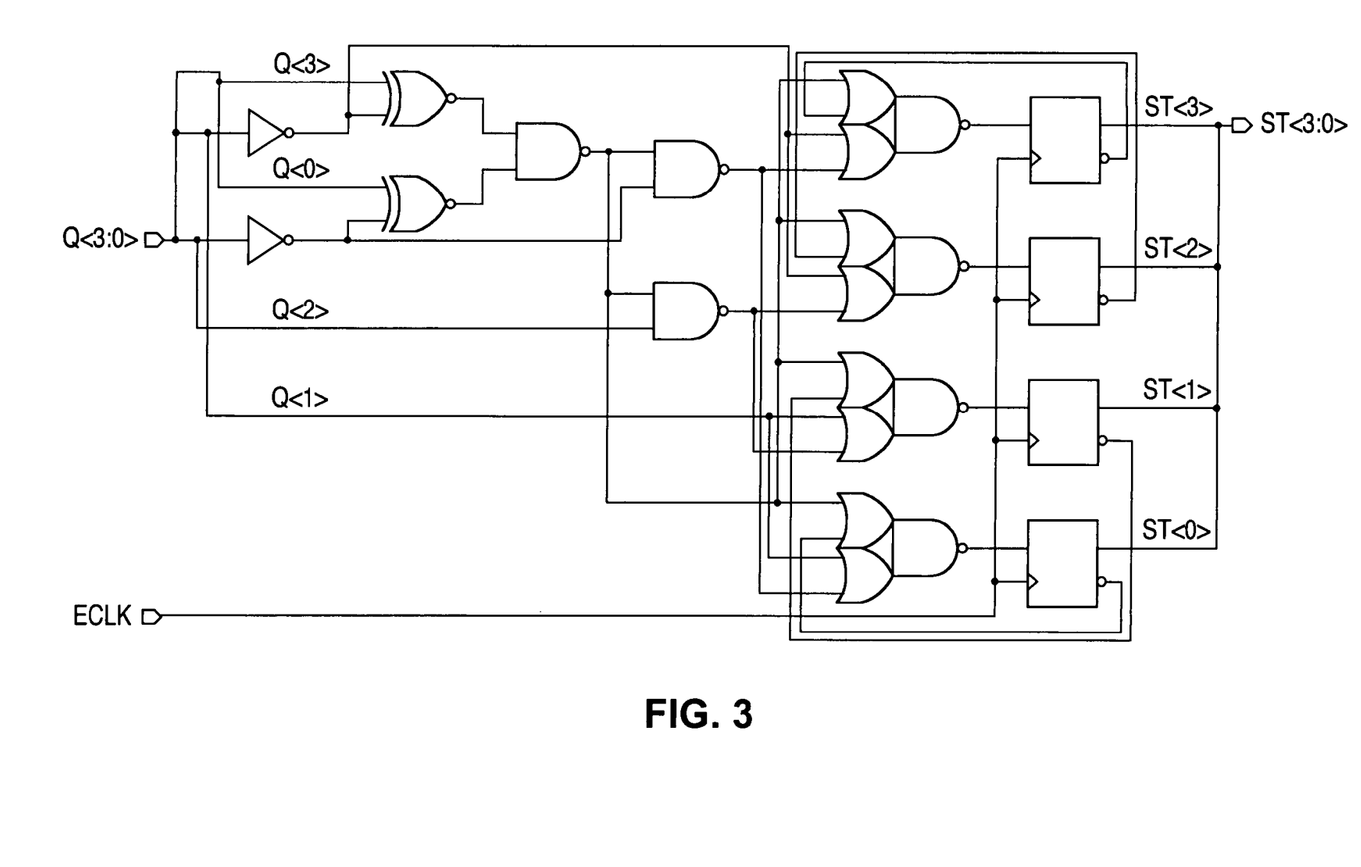
FIG. 3 is a block diagram illustrating an advantageous embodiment of a state detector circuit of the quadruple phase clock generator circuit shown in FIG. 2A.

As previously mentioned, the edges that are detected by the edge detector circuit 140 (designated with the letters "ECLK") are provided to the state detector circuit 130 and are used to latch the state of the four (4) shifted clock signals from the quadruple phase generator circuit 110. FIG. 3 is a block diagram illustrating an advantageous embodiment of the state detector circuit 130. State detector circuit 130 selects a stable clock signal from among the four (4) phase shifted clock signals using a multiplexer circuit. The recovered clock signal is synchronized at the middle of the data. The recovered clock signal (designated with the letters "ST") is provided as an input to the decision logic circuit 120.

Figure 4:
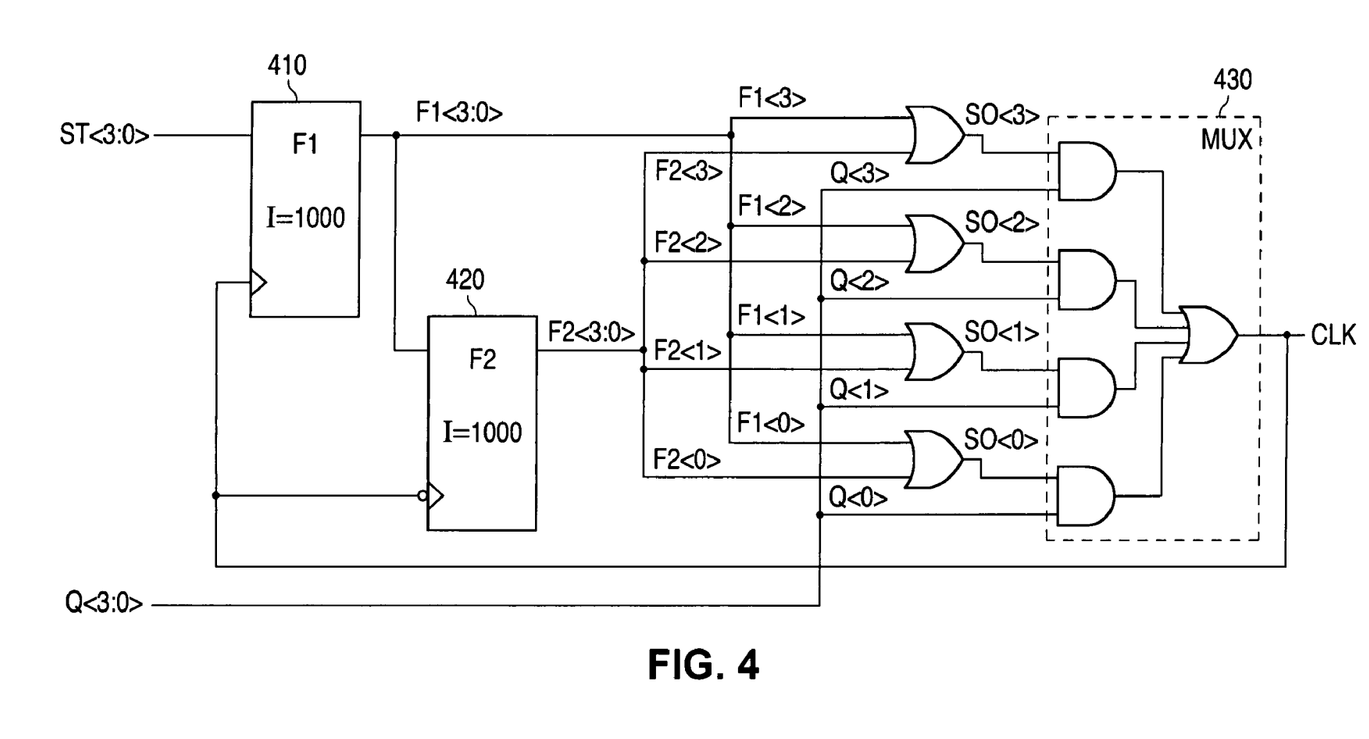
FIG. 4 is a block diagram illustrating an advantageous embodiment of a decision logic circuit of the quadruple phase clock generator circuit shown in FIG. 2A.

FIG. 4 is a block diagram illustrating an advantageous embodiment of the decision logic circuit 120. The decision logic circuit 120 receives the recovered synchronized clock signal ST from the state detector circuit 130. The decision logic circuit 120 also receives the four (4) shifted clock signals (Q0, Q1, Q2 and Q3) from the quadruple phase clock generator 110.

If the clock signal ST represents the S0 state (i.e., Q0, Q1-bar, Q2-bar, Q3) then the decision logic circuit 120 will select the Q2 clock signal to be the output clock signal CLK.

If the clock signal ST represents the S1 state (i.e., Q0, Q1, Q2-bar, Q3-bar) then the decision logic circuit 120 will select the Q3 clock signal to be the output clock signal CLK.

If the clock signal ST represents the S2 state (i.e., Q0-bar, Q1, Q2, Q3-bar) then the decision logic circuit 120 will select the Q0 clock signal to be the output clock signal CLK.

Lastly, if the clock signal ST represents the S3 state (i.e., Q0-bar, Q1-bar, Q2, Q3) then the decision logic circuit 120 will select the Q1 clock signal to be the output clock signal CLK.

As shown in FIG. 4, the decision logic portion of decision logic circuit 120 comprises a first four (4) bit register 410 (designated "F1"), a second four (4) bit register 420 (designated "F2"), and multiplexing logic elements including multiplexer 430. The output of multiplexer 430 must not have any glitches because the output of multiplexer 430 is the clock signal CLK. For this reason the decision logic portion of the circuit must eliminate any glitches in the output clock signal CLK.

To accomplish the elimination of glitches the first register 410 "F1" is active at the rising edge of the clock signal CLK. On the other hand, the second register 420 "F2" is active at the falling edge of the clock signal CLK. By logically OR-ing the outputs designated SO<3:0> of the first and second registers, 410 and 420, one of the input values Q<3:0> is selected as the clock signal CLK.

Each of first register 410 and second register 420 has only four (4) valid values. The valid values are 1000, 0100, 0010 and 0001. The initial reset value (designated "I") for each register is 1000. The initial reset value I=1000 is shown on first register 410 and on second register 420 in FIG. 4. Therefore, only one (1) bit of SO<3:0> is active at any time. This means that only one (1) of the four (4) clock input signals Q<3:0> is selected to be the clock signal CLK.

The combination of the rising and falling edge of the clock signal CLK prolongs a one half cycle of clock signal CLK in order to keep the selected output SO<3:0> unchanged while the signal ST<3:0> is varying. This means that the CLK signal that is outuput from multiplexer 430 will be a glitch free signal.

In summary, after an edge of the data occurs, a state of the quadrupled phase shifted clock is sampled. The selected shifted clock signal from the quadruple phase clock generator circuit 110 is used to delay the receive side clock to be at the center of the data period to allow the stable setup and hold time of the flip flop circuits. The selected phase clock signal will continue to be available until another transition is detected. The jitter and skew in the clock signal does not have much effect because the sampling period is dependent on sequential ones and zeros. In other words, a resynchronization is based on the data transitions.

Figure 5:
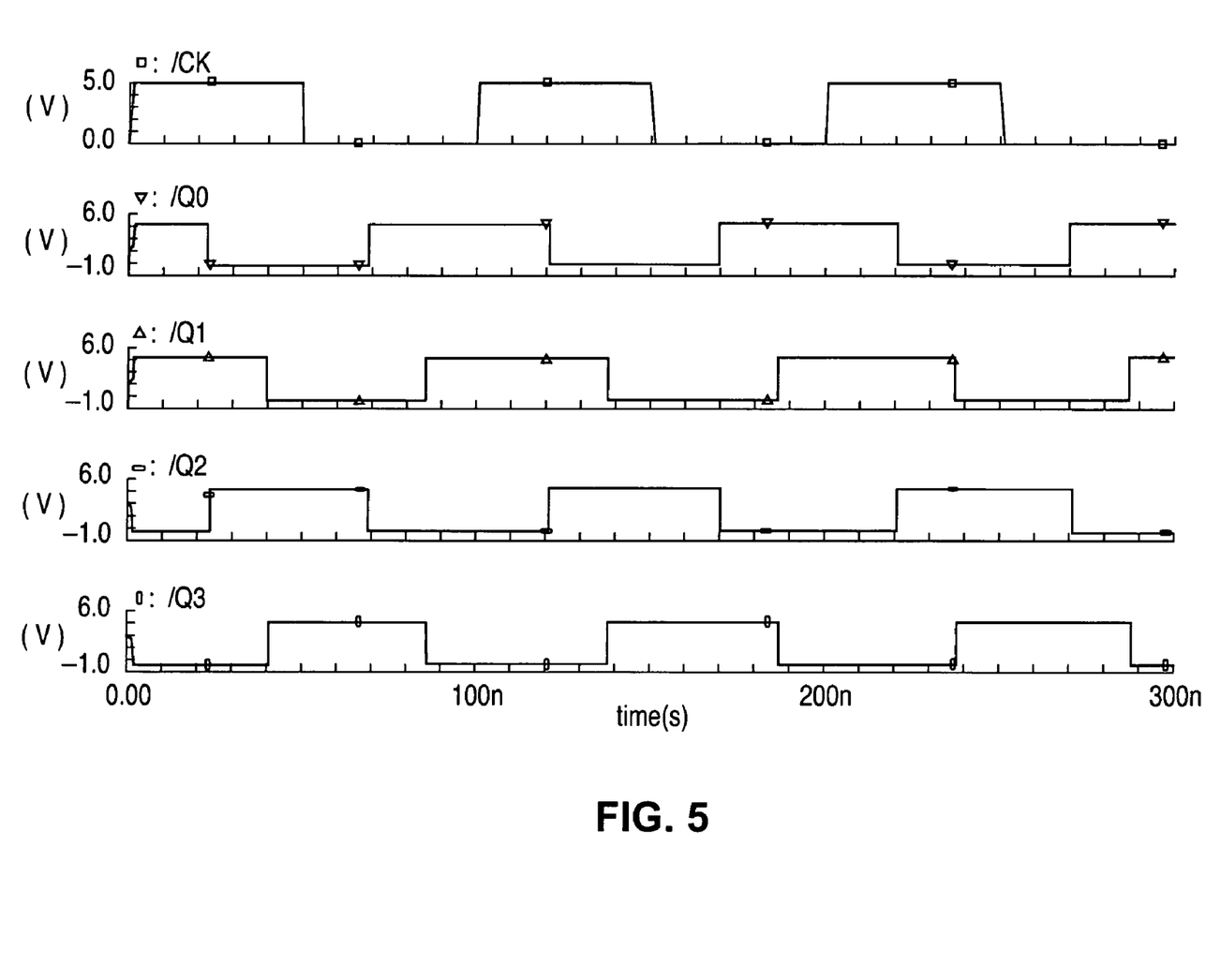
FIG. 5 is a timing diagram illustrating a simulation result of quadruple phase clock waveforms of the quadruple phase clock generator circuit shown in FIG. 2A.

FIG. 5 is a timing diagram illustrating a simulation result of quadruple phase clock waveforms of the quadruple phase clock generator circuit 110. The waveforms for the signals CK, Q0, Q1, Q2 and Q3 are shown as functions of time. A time period of approximately three hundred nanoseconds (300 ns) is shown in FIG. 5. As may be seen by referring to FIG. 5, the quadruple phase clock generator circuit 110 of the present invention always guarantees a fifty percent (50%) duty cycle. This is because the sum of two (2) periods of glitch clock signal (DCK) in FIG. 2B is always one half of the period of the input clock signal (CK). This is due to (1) the symmetry structure of the frequency doubler circuit 210, and (2) the fact that first D-flip flop circuit 220 and second D-flip flop circuit 230 are synchronized.

The sampling scheme of the present invention eliminates the need for a complex and power hungry phase locked loop (PLL) circuit in a clock and data recovery (CDR) circuit. Over a noisy medium, sampling at the baud center provides the best estimate of the data value. Due to its simplicity a quadruple phase shifted clock generator is adequate in most digital applications. The clock synchronization concept of the present invention is self-timed and does not rely on varying intrinsic process parameters, supply voltage and junction temperature ("PVT"). The only requirement is that the source and destination have approximately the same clock frequency (i.e., the global clock).

The clock and data recovery (CDR) circuit of the present invention uses a global clock to establish the rate of data transmission and does not require low level flow control. The clock and data recovery (CDR) circuit of the present invention also does not require the overhead of handshake circuitry. The self-timed clock and data recovery (CDR) interface of the present invention compensates for the skew between them. The absence of flow control signals distinguishes the clock and data recovery (CDR) circuit of the present invention from other types of clock and data recovery (CDR) circuits. The absence of flow control signals eliminates the round trip delay of purely self-timed interface and avoids the latency required for reliable synchronization of flow control signals in a synchronous design.

Figure 6:
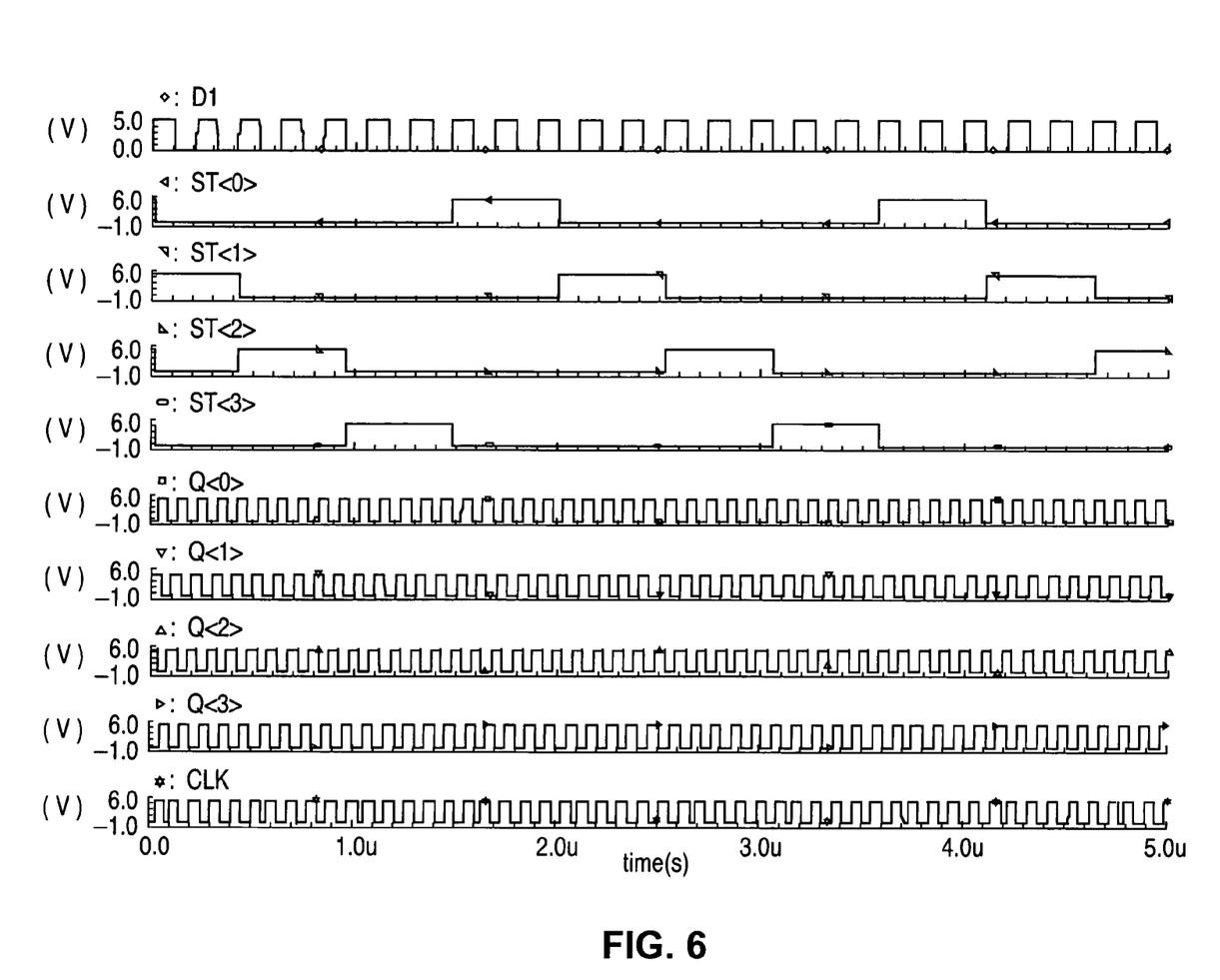
FIG. 6 is a timing diagram illustrating a simulation result of quadruple phase clock waveforms of the quadruple phase clock generator circuit shown in FIG. 2A for a case in which a data signal changes faster than a clock signal.

FIG. 6 is a timing diagram illustrating a simulation result of quadruple phase clock waveforms of the quadruple phase clock generator circuit 110 for a case in which a data signal changes faster than a clock signal. The output clock signal CLK is shown on the bottom line of FIG. 6. The output clock signal CLK is a glitch free signal.

FIG. 5 and FIG. 6 illustrates one example of how the clock signal CLK varies with the time of receipt of data. In FIG. 6 the data signal changes faster than a clock signal. Therefore, the cycle of clock signal CLK is decreased and creates a narrow low duty ratio.

Figure 7:
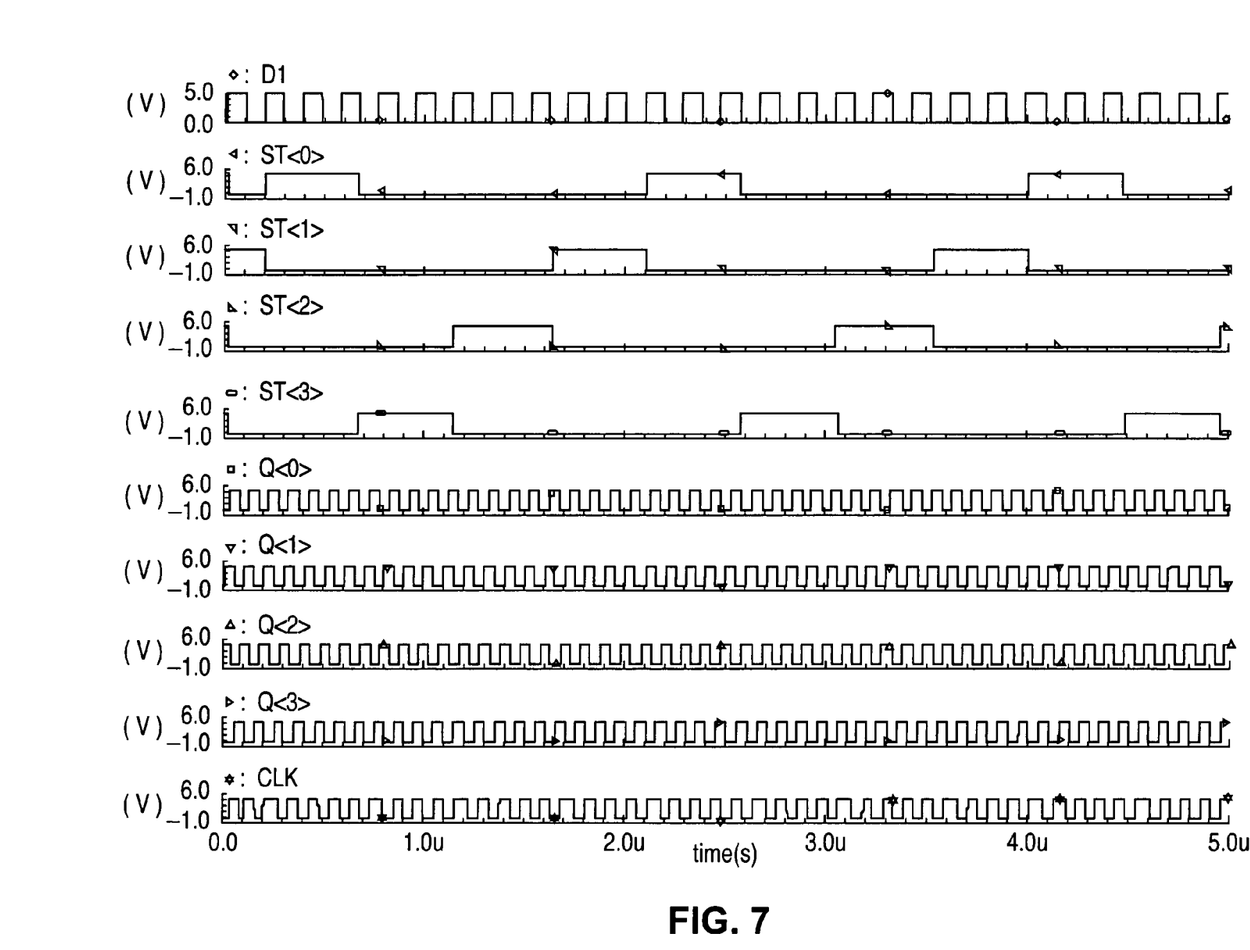
FIG. 7 is a timing diagram illustrating a simulation result of quadruple phase clock waveforms of the quadruple phase clock generator circuit shown in FIG. 2A for a case in which a data signal changes slower than a clock signal.

FIG. 7 is a timing diagram illustrating a simulation result of quadruple phase clock waveforms of the quadruple phase clock generator circuit 110 for a case in which a data signal changes slower than a clock signal. The output clock signal CLK is shown on the bottom line of FIG. 7. The output clock signal CLK is a glitch free signal.

FIG. 5 and FIG. 7 illustrates another example of how the clock signal CLK varies with the time of receipt of data. In FIG. 7 the data signal changes slower than a clock signal. Therefore, the cycle of clock signal CLK is increased and creates a wide high duty ratio.

Although the present invention has been described in connection with an embodiment having four shifted clock signals, it is understood that the use of four shifted clock signals is merely illustrative. Specifically, it is understood that it is possible to practice the principles of the invention using more than four shifted clock signals or using fewer than four shifted clock signals depending upon the requirements of a particular application.

Although the present invention has been described with several embodiments, various changes and modifications may be suggested to one skilled in the art. It is intended that the present invention encompass such changes and modifications as fall within the scope of the appended claims.

What is claimed is:

1. A method of clock recovery comprising the steps of:
    receiving an input clock signal;
    generating a plurality of shifted clock signals from said input clock signal;
    detecting an edge of an input data signal;
    using the detected edge to latch a state of said shifted clock signals;
    selecting one of said shifted clock signals based on the latched state;
    eliminating at least one glitch signal from said selected shifted clock signal; and
    outputting the selected shifted clock signal as an output clock signal;
    wherein eliminating the at least one glitch signal from the selected shifted clock signal comprises:
        storing the latched state in a first register and a second register, an input of the second register coupled to an output of the first register; and
        performing a plurality of logical OR operations each involving an output of the first register and a corresponding output of the second register.

2. The method as set forth in claim 1 wherein said plurality of shifted clock signals comprises four shifted clock signals.

3. The method as set forth in claim 2 further comprising the step of operating said output clock signal at a fifty percent duty cycle.

4. The method as set forth in claim 1 further comprising the step of synchronizing said output clock signal at a center of the input data signal.

5. The method as set forth in claim 4, further comprising the step of continuing to make said selected shifted clock signal available until a detection of another data signal transition.

6. The method of claim 1, wherein eliminating the at least one glitch signal from the selected shifted clock signal further comprises:
    clocking the first and second registers using different edges of the output clock signal.

7. The method of claim 6, wherein eliminating the at least one glitch signal from the selected shifted clock signal further comprises:
    performing a plurality of logical AND operations each involving a result of one of the logical OR operations and one of the shifted clock signals; and
    performing a second logical OR operation involving results of the logical AND operations.

8. A clock and data recovery circuit comprising:
    a phase clock generator circuit operable to generate a plurality of shifted clock signals from an input clock signal;
    a decision logic circuit operable to receive said shifted clock signals and outputting a selected one of said shifted clock signals as an output clock signal; and
    a state detector circuit operable to use a detected edge of an input data signal to latch a state of said shifted clock signals;
    wherein the output clock signal that is output by the decision logic circuit is based on the latched state; and
    wherein the decision logic circuit comprises:
        (1) first and second registers each operable to store the latched state, wherein an input of the second register is coupled to an output of the first register, and wherein the first and second registers are clocked using different edges of the output clock signal, and
        (2) a plurality of OR gates each operable to perform a logical OR operation involving an output of the first register and a corresponding output of the second register.

9. The clock and data recovery circuit as set forth in claim 8 wherein said phase clock generator circuit is a quadruple phase clock generator circuit and wherein said plurality of shifted clock signals comprises four shifted clock signals.

10. The clock and data recovery circuit as set forth in claim 9, wherein the clock and data recovery circuit is capable of operating with said output clock signal at a fifty percent duty cycle.

11. The clock and data recovery circuit as set forth in claim 8 further comprising:
    an edge detector circuit operable to detect the detected edge of the input data signal.

12. The clock and data recovery circuit as set forth in claim 11 wherein said edge detector circuit is operable to detect one of: a rising edge of the input data signal and a falling edge of the input data signal.

13. The clock and data recovery circuit as set forth in claim 8 wherein said state detector circuit is operable to synchronize said output clock signal at a center of the input data signal and to make said selected shifted clock signal available until a detection of another data signal transition.

14. The clock and data recovery circuit of claim 8, wherein the decision logic circuit further comprises:
a multiplexer operable to receive outputs of the OR gates.

15. The clock and data recovery circuit of claim 14, wherein the multiplexer comprises:
a plurality of AND gates each operable to perform a logical AND operation involving the output of one of the OR gates and one of the shifted clock signals; and
an additional OR gate operable to perform a logical OR operation involving outputs of the AND gates.

16. A clock and data recovery circuit comprising:
a quadruple phase clock generator circuit configured to generate four shifted clock signals from an input clock signal;
a decision logic circuit configured to receive said four shifted clock signals and to output a selected one of said four shifted clock signals as an output clock signal;
an edge detector circuit configured to detect an edge of an input data signal; and
a state detector circuit configured to use a detected edge of the input data signal to latch a state of said four shifted clock signals;
wherein the output clock signal that is output by the decision logic circuit is based on the latched state; and
wherein the decision logic circuit comprises:
(1) first and second registers each operable to store the latched state, wherein an input of the second register is coupled to an output of the first register, and wherein the first and second registers are clocked using different edges of the output clock signal, and
(2) a plurality of OR gates each operable to perform a logical OR operation involving an output of the first register and a corresponding output of the second register.

17. The clock and data recovery circuit as set forth in claim 16 wherein said quadruple phase clock generator circuit comprises:
a frequency doubler circuit configured to receive the input clock signal and to generate a glitch clock signal;
a first flip-flop circuit configured to receive said glitch clock signal and to generate a first shifted clock signal and a second shifted clock signal; and
a second flip-flop circuit configured to receive said glitch clock signal and to generate a third shifted clock signal and a fourth shifted clock signal.

18. The clock and data recovery circuit as set forth in claim 16 wherein said decision logic circuit is configured to eliminate at least one glitch signal from said selected shifted clock signal.

19. The clock and data recovery circuit of claim 16, wherein the decision logic circuit further comprises:
a multiplexer operable to receive outputs of the OR gates.

20. The clock and data recovery circuit of claim 19, wherein the multiplexer comprises:
a plurality of AND gates each operable to perform a logical AND operation involving the output of one of the OR gates and one of the shifted clock signals; and
an additional OR gate operable to perform a logical OR operation involving outputs of the AND gates.

21. The clock and data recovery circuit as set forth in claim 16, wherein the clock and data recovery circuit is capable of operating with the output clock signal at a fifty percent duty cycle.

* * * * *